Oct. 15, 1929.  J. C. GROBLE ET AL  1,732,012
FLUID PRESSURE REGULATOR
Filed Oct. 8, 1927

INVENTORS.
JACOB C. GROBLE.
JAMES POLLOCK.
WILLIAM C. GROBLE.
BY
ATTORNEYS.

Patented Oct. 15, 1929

1,732,012

UNITED STATES PATENT OFFICE

JACOB C. GROBLE, JAMES POLLOCK, AND WILLIAM C. GROBLE, OF ANDERSON, INDIANA, ASSIGNORS TO GROBLE GAS REGULATOR COMPANY, OF ANDERSON, INDIANA, A CORPORATION

FLUID-PRESSURE REGULATOR

Application filed October 8, 1927. Serial No. 224,966.

This invention relates to improvements in fluid pressure regulators particularly adaptable as district station governors for gas mains and the like and more specifically to the well known Reynolds type of pressure regulating system.

One object of the invention is to provide a device which will automatically increase and decrease the outlet pressure of the main regulator according to demand, which is accomplished by the attachment of a secondary lever to the overhanging end of the main regulator lever by means of a link or the like. The secondary lever is arranged for a greater ratio of travel than the main regulator lever, the far end of the secondary lever being located over the low pressure auxiliary regulator and having a spring connection therewith, as will be hereinafter more fully set forth and described.

Another object of the invention resides in the arrangement of the main regulator and particularly the valves and valve stem therein, whereby they may be readily disassociated and removed, or the valve disks changed without disturbing other parts of the device as heretofore. This arrangement is obtained by providing means for disconnecting the valve stem intermediate the valves in such manner as to permit its disassociation thereof and the removal of the valves through suitable openings provided in the housing.

Another feature of the invention resides in the provision of a by-pass or equalizer pipe connecting the upper portion of the main regulator housing and its associated main governor bowl or diaphragm housing with the outlet end of the main. This arrangement acts to eliminate the dead pocket formed between the main regulator valve and its associated governor bowl, which pocket normally fills with gas producing an over pressure at various times which heretofore has been compensated for by over-weighting the main regulator lever to a predetermined amount. Since the pressure accumulated by the gas formed in the pocket varies, it is impossible to properly compensate therefor by over-weighting said lever which has heretofore caused improper balancing and preventing the accurate control of the discharge pressure of the gas. By providing the equalizer pipe or by-pass the gas pressure accumulating in said pocket is relieved so that no pressure is built up therein for which compensation is required.

The full nature of the invention will be understood from the accompanying drawing and the following description and claims.

Figures 1, 2:
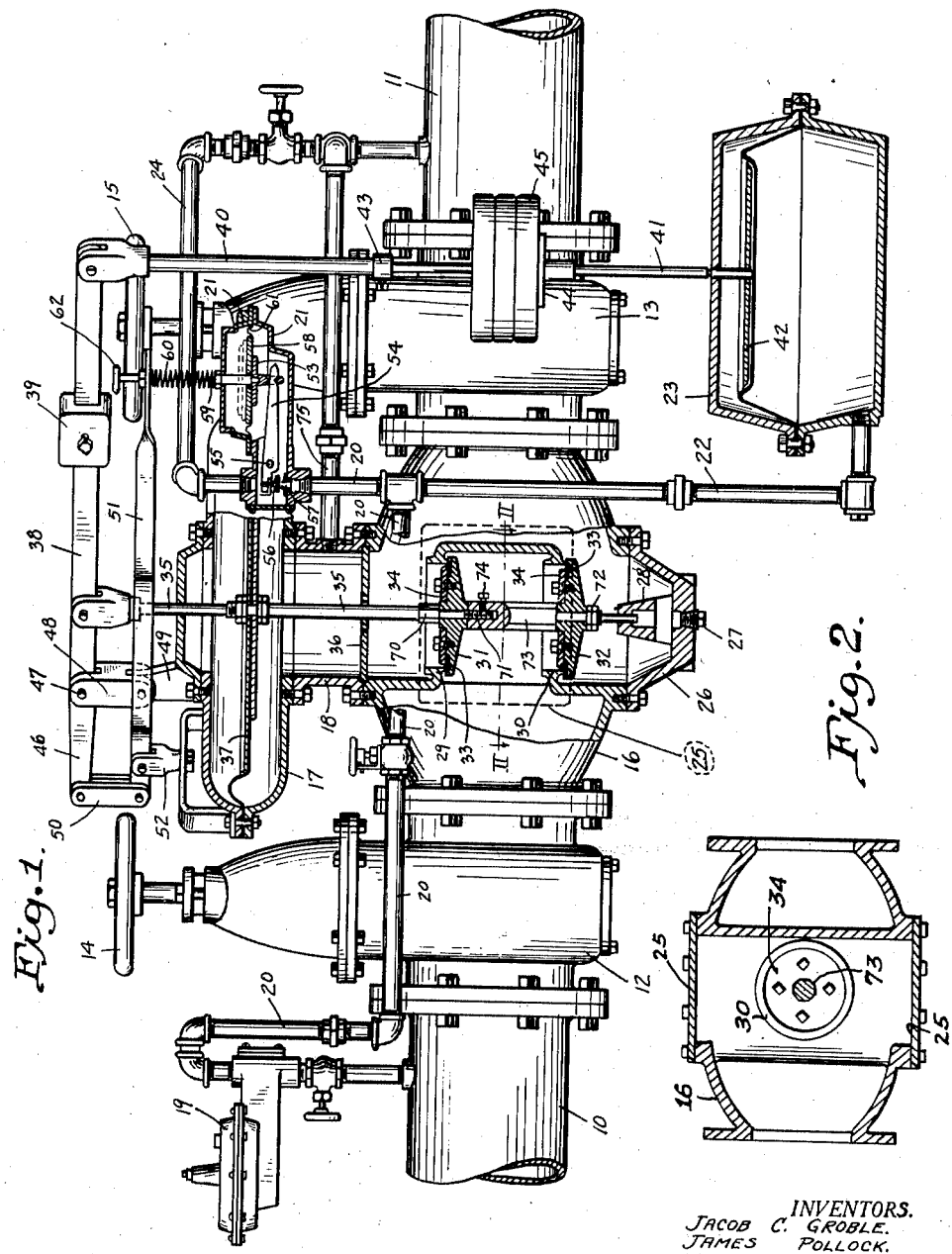
Figure 1 is a side elevation of the device showing the regulators, valves, diaphragms and the like in central vertical cross section.
Fig. 2 is a sectional view taken on the line II—II of Figure 1 looking downwardly.

In the drawings there is shown a main gas pipe having an inlet end 10 and an outlet end 11. Mounted in said pipe in the usual manner there are a pair of gate valves 12 and 13 controlled by the hand wheels 14 and 15. Intermediate said gate valves there is a main regulator having a housing 16 above which is mounted a main regulator diaphragm bowl 17 connected by a double flanged connector 18. At the inlet end 10 of the main there is a high pressure regulator 19 which is connected through the pipe 20 with the low pressure regulator 21. The pipe 20 is connected with a pressure pipe 22 which communicates with the lower portion of the master bowl 23. The low pressure regulator 21 is also connected through the pipe 24 with the discharge end 11 of the main.

The main regulator housing is provided with side openings closed by removable hand plates 25 shown in Figure 2, and capable of being readily removed to afford access to the valves therein. The lower part of the housing is provided with a removable bottom guide 26 having a drain plug 27 and an upwardly extending guide member 28. Contained within the valve housing there is an upper valve seat 29 and a lower seat 30. The upper valve 31 is adapted to seat on the lower side of the upper seat 29, and the lower valve 32 is adapted to seat upon the lower side of the lower valve seat 30. Each of the valves 31 and 32 are provided with suitable valve disks 33 held in place by the removable plates 34, whereby said valve disks may be readily changed upon the valves for purposes of renewal. Said valves are connected by a valve stem 35, the lower end of which is slidably mounted in the guide member 28, while the upper end thereof extends through the guide plate 36 mounted in the upper part of the valve housing, and through the connector 18 through the main regulator diaphragm 37 and the housing 17 thereof, so as to have pivotal connection at the upper end thereof with the main lever 38. The main lever is provided with an adjustable weight 39 slidable thereon and the free end thereof is connected through the telescopic pipe 40 and rod 41 with the diaphragm plate 42 contained in the master bowl. Said telescopic pipe and rod 40 and 41 are adjustably connected through the set collar 43 and are provided with the plate 44 for receiving the weights 45.

The above described parts of the device are of the usual character and well known in the art and no claim is made to any feature pertaining thereto.

As herein shown, the main lever instead of having its pivoted ends secured directly to the support as heretofore, is provided with an overhang portion 46 which is pivoted at 47 to the supporting link 48, which in turn is pivoted upon the bracket 49 mounted on the top of the main regulator bowl. The free end of the overhang portion 46 is pivotally connected by means of the link 50 with the overhanging end of the auxiliary lever 51. Said auxiliary lever is pivoted to the fixed support 52 adjacent the link 50 and extends to a position so that its free end is immediately over the center of the low pressure regulator 21.

Said low pressure regulator comprises the diaphragm 61 secured between the upper and lower parts of the housing, said diaphragm being secured to the lever plate 53 having the usual connection with the free end of the lever 54 which is pivoted at 55 and provided with the valve 56 adapted to close the opening 57. Mounted on the upper part of the diaphragm and lever plate there is a pressure plate or weight 58 which may be varied, if desired, by adding additional weights thereon, as shown in dotted lines, said weight surrounding the stud 59 extending upwardly through the top of the housing and having its lower end connected with the diaphragm and lever plate. Interposed between the free end of the lever 51 and the stud 59 there is a compression spring 60, the upper end of said pressure spring being connected to the lever by the adjusting screw 62.

In operation, the master bowl and lever of the main regulator is weighted for the maximum outlet pressure, say six inches or more, by means of the weights 39 and 45. The low pressure secondary regulator 21 is weighted by the weight 58 contained therein for the minimum outlet pressure of three inches or more for example. The compression spring 60 is then adjusted to exert a force on the low pressure regulator by screwing the adjusting screw 62 down against the spring 60, which adjustment is made when the main regulator is feeding at three inches per minimum outlet pressure. Thereupon the main regulator starts to feed a larger volume, increasing the fluid flow from pipe 20 directly to the low pressure regulator thereby resulting in a drop of pressure in the lower part of the bowl 23 which causes the main lever 38 to travel downward and open the valves 31 and 32 of the main regulator. At the same time the main lever causes the secondary lever 51 to travel downward more rapidly and to a greater extent than the main lever, the tension on the spring 60 is increased, which causes the outlet pressure of the low pressure secondary regulator to increase to six inches or more. When the demand decreases or ceases and the flow slows up through the main regulator, the main lever 38 starts to rise and closes the valves 31 and 32 of the main regulator, causing the secondary lever 51 to rise more rapidly and to a greater extent than the main lever. This is caused by the difference in ratio from the fulcrum pin to the end of the lever, and releases the tension on the spring 60 which causes the pressure on the secondary regulator to recede to three inches or a minimum pressure, and at the same time causes the outlet pressure on the main regulator to recede to three inches or minimum pressure. The above action is controlled by the increase and decrease demand of flow through the main regulator. The spring 60 between the low pressure secondary regulator and the secondary lever 51 may be substituted by a dead weight or the like, although the spring 60 with its adjusting screw 61 permits of more ready adjustment.

As illustrated, the valve stem 35 is formed in two parts, the upper part being connected to the lever 38 and to the diaphragm 37 and extending through the upper portion of the housing 17. It is provided with a hex stem 70 mounted on the screw threaded end 71 thereof. The valve 31 is mounted over the end 71 and abuts against said hex stem. The lower part of the stem is provided with the lock nuts 72 which support the lower valve 32, said valve being secured thereagainst in position by the hex-portion 73 which is internally screw threaded at its upper end to receive the screw threaded end 71 and space the two valves apart, thus the lower part of the valve stem below the valve 31 is detachable from the upper part and locked thereon by the set screw 74.

When it is desired to remove the valves or replace the valve disks, instead of it being necessary to disconnect the valve stem from the lever 38 and open up the main governor bowl 17 and disconnect the stem from the diaphragm 37 as heretofore, the hand plate 25 may be removed and a wrench applied to the hex stem 70 and the hex-portion 73 so as to unscrew it and separate the two sections of the stem. The lower section with the valve 32 may then be lowered through the opening closed by the bottom guide 26, and the upper valve 31 may be readily removed through the hand hole opening.

As it sometimes happens a pocket of gas forms in the connector 18, or that portion of the device between the upper part of the main regulator and the main regulator governor bowl, which pocket of gas produces a pressure to a varying extent, which must be compensated for by an increase of the weight 39 or 45. Since such pressure is not constant, making it difficult to properly compensate therefor by increasing the weight, the equalizer pipe 75 is provided for connecting said pocket with the outlet end 11 of the main. This relieves the pocket of any undue pressure which obtains therein, and accordingly the necessity of compensating therefor by an increase of weight.

The invention claimed is:

1. In a fluid pressure regulator, the combination with a main regulator, an auxiliary low pressure regulator, a master bowl, and a main lever connecting the diaphragms of said main pressure regulator and bowl, of a secondary lever associated with said main lever and connected with said low pressure regulator for compensating for variations in outlet pressure.

2. In a fluid pressure regulator, the combination with a main regulator, an auxiliary low pressure regulator, a master bowl, and a main lever connecting the diaphragms of said main pressure regulator and bowl, of a secondary lever operatively connected with said main lever and said auxiliary regulator, whereby said auxiliary lever will be actuated more rapidly and through a greater distance of travel than said main lever by the action of the latter for compensating for variations in outlet pressure.

3. In a fluid pressure regulator, the combination with a main regulator, an auxiliary low pressure regulator and a master bowl, of a lever fulcrumed adjacent one end on said main regulator and having one end connected with said bowl, means for connecting said lever intermediate said end and its fulcrum point with said main regulator, an auxiliary lever fulcrumed adjacent one end on said main regulator, a link connection between the free end of the auxiliary lever and the other end of said main lever, and means for connecting the other end of said auxiliary lever with said auxiliary regulator so that the said last mentioned end thereof will have a greater movement than the connection between said main lever and main regulator.

4. In a fluid pressure regulator, the combination with a main regulator, an auxiliary low pressure regulator and a master bowl, of a main lever fulcrumed adjacent one end on said main regulator and having one end connected with said bowl, means for connecting said lever intermediate said end and its fulcrum point with said main regulator, an auxiliary lever fulcrumed adjacent one end on said main regulator, a link connection between the free end of the auxiliary lever and the other end of said main lever, and a spring connection between the other end of said auxiliary lever and said auxiliary regulator arranged so that the said last mentioned end thereof will have a greater movement than the connection between said main lever and main regulator.

5. In combination with a control valve having a main valve beam, and a loaded auxiliary regulator for the main valve, an auxiliary lever associated with said beam for changing the adjustment of said loaded regulator, said auxiliary lever being connected to said main beam so as to be operated by the same but to travel a different distance than said beam.

6. In combination with a Reynolds type pressure controlling valve having a main valve beam and a regulator controlling the operation thereof, a connection between the main valve beam and the regulator for changing the adjustment of the regulator to increase the pressure on the low pressure side of the valve at large valve openings, said connection comprising an auxiliary lever associated with said main valve beam.

7. In combination with a Reynolds type pressure controlling valve having a main valve beam and a regulator controlling the operation thereof, a connection between the main valve beam and the regulator for changing the adjustment of the regulator to increase the pressure on the low pressure side of the valve at large valve openings, said connection comprising an auxiliary lever associated with said main valve beam, said auxiliary lever being connected to said main beam in such a manner as to be actuated more rapidly and through a greater distance of travel than said main beam, by the action of the latter for compensating for variations in outlet pressure.

In witness whereof, we have hereunto affixed our signatures.

JACOB C. GROBLE.
JAMES POLLOCK.
WILLIAM C. GROBLE.